United States Patent Office 3,147,025
Patented Sept. 1, 1964

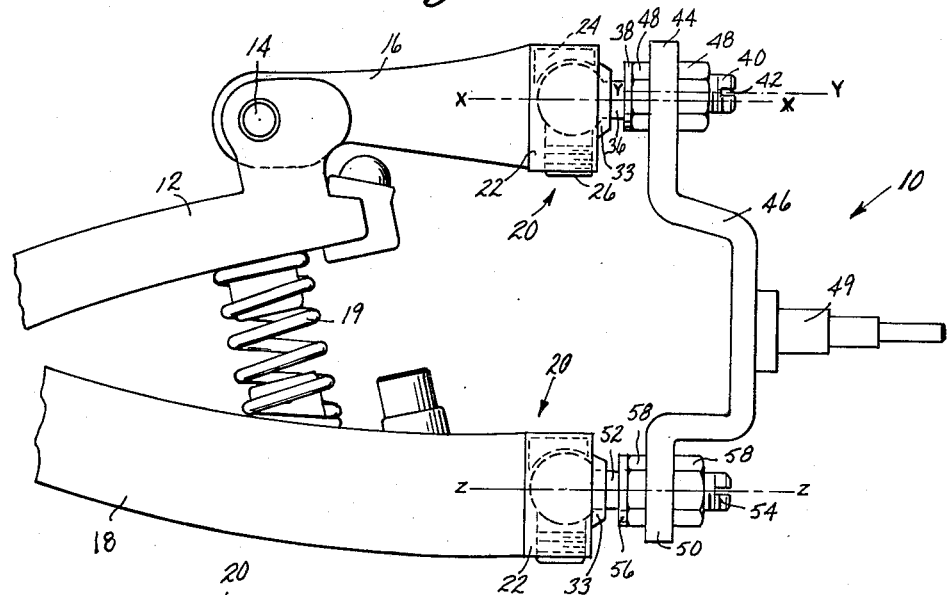
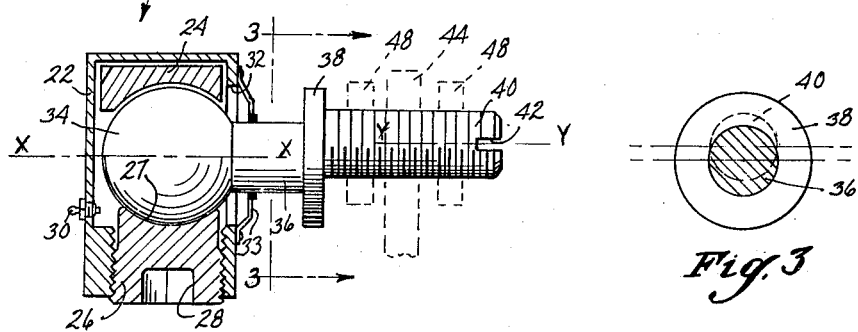
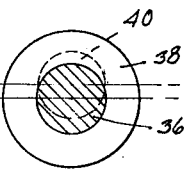

3,147,025
FRONT WHEEL VEHICLE SUSPENSION SYSTEM
Ellis D. Good, Apt. D, 406 N. I St., Lompoc, Calif.
Filed Apr. 30, 1963, Ser. No. 276,943
1 Claim. (Cl. 280—96.2)

This invention relates to automotive vehicles and, more particularly, to an improved end suspension system therefor.

It is an object of the present invention to provide an effective front wheel vehicle suspension system which will require a minimum amount of adjustment during prolonged use, and which can be readily repaired and maintained in a minimum amount of time.

A further object of the present invention is to provide a front wheel vehicle suspension system of the type described in which the caster and camber adjustments therefor can be easily set by adjustment of two ball support members.

All of the foregoing and still further objects and advantages of this invention will become apparent from a study of the following specification, taken in connection with the accompanying drawing, wherein:

FIGURE 1 is a fragmentary front elevational view of a front wheel vehicle suspension system made in accordance with the present invention;

FIGURE 2 is an enlarged fragmentary cross sectional view of a ball joint structure forming a part of the present invention; and FIGURE 3 is a transverse cross sectional view taken along line 3—3 of FIGURE 2.

Referring now to the drawing, a front wheel suspension system 10 made in accordance with the present invention is shown to include a cross frame member 12 having an upper pivot 14, to which one end of an upper guide link 16 is secured. A lower guide arm 18 is pivotally mounted beneath and relative to the cross frame member 12, directly beneath the upper guide link 16.

The outer end of each of the upper guide link and lower guide arm members is provided with a ball joint structure 20, as is more clearly shown in FIGURE 2. Each ball joint structure 20 includes a housing 22 having a concave bearing block 24 mounted within the upper end thereof and an adjustment screw 26 threadedly mounted in the lower end thereof having a concave bearing seat 27 and a wrench socket 28. A grease fitting 30 secured to the housing 22 provides means for filling the interior thereof with grease to minimize wear. The outer wall of the housing 22 is provided with an opening 32 through which a ball member 34 is secured upon the shaft 36 and may be inserted, after which the adjustment screw 26 may be tightened to properly seat the ball 34 between the bearing block 24 and seat 27 of the adjustment screw. A grease seal 33 overlies the enlarged opening 32 and retains the grease within the housing.

In the upper joint structure, the shaft 36 is provided with a collar 38 and an eccentric threaded extension 40 having a screwdriver slot 42 at its outermost end to facilitate rotation thereof for adjustment purposes. The longitudinal axis Y—Y of the extension 40 is offset with respect to the line X—X which extends parallel to the axis and through the center of the ball 34. The threaded shaft 40 is received through an enlarged opening in the upper end of a wheel plate 44 which may be adjusted along the length of the threaded shaft portion 40 by means of a pair of lock nuts 48.

The mid section 46 of the wheel plate is provided with an axle 49, and the lower end 50 of the wheel plate is mounted between a pair of lock nuts 58 upon a threaded shaft 54 which is axially aligned with the shaft 52 and collar 56 of the lower joint structure as shown by the line Z—Z.

It will thus be recognized that by rotating the threaded shaft 40 of the upper joint structure, the eccentric relationship of the threaded shaft portion 40 to the ball 34, will provide an adjustment in the caster of the wheel. Similarly, because of the axially aligned lower joint structure, the camber of the wheel may be adjusted by adjusting the position of the lower end 50 of the wheel plate along the length of the threaded shaft 54. The wheel plate is locked in its adjusted position along the length of the upper and lower threaded shaft elements by means of the associated lock nuts 48, 58. Because of the enlarged openings 32 in the ball joint structures, sufficient clearance is provided for substantial angular movement of the upper and lower shafts during normal movement of the vehicle. During normal wear of the parts, the adjustment screws 28 may be tightened to accommodate wear of the ball elements 54, thus maintaining a proper fit between the parts at all times.

While this invention has been described with particular reference to the construction shown in the drawing, it is to be understood that such is not to be construed as imparting limitations upon the invention, which is best defined by the claim appended hereto.

Having thus described my invention, I claim as new and desire to secure by Letters Patent:

A front wheel suspension system for vehicles comprising, in combination, a cross frame, a lower guide arm member mounted at its inner end for pivotal movement relative to said cross frame, an upper guide link member pivotally connected at its inner end to said cross frame, the outer ends of said guide arm and guide link members being in substantially vertical alignment, a wheel plate, a ball joint structure adjustably securing the upper end of said plate to said outer end of said guide link member, and a ball joint structure adjustably securing the lower end of said plate to said outer end of said guide arm member, each said ball joint structure comprising a substantially horizontal shaft, and a pair of lock nuts adjustably carried horizontally by one end of said shaft on opposite sides of said plate axially adjustably securing said plate horizontally upon said one end of said shaft, the opposite end of said shaft comprising a ball, and a bearing carried by said outer end of each of said guide members rotatably receiving said respective balls, the longitudinal axis of said shaft of said upper guide link member ball joint structure being eccentric with respect to a diameter of said respective ball extending parallel to said shaft.

References Cited in the file of this patent
UNITED STATES PATENTS

| | | |
|---|---|---|
| 1,845,095 | Nickelsen | Feb. 16, 1932 |
| 1,848,471 | Gebert et al. | Mar. 8, 1932 |
| 1,940,466 | Sneed | Dec. 19, 1933 |
| 2,173,973 | Leighton | Sept. 26, 1939 |
| 2,455,343 | Slack et al. | Nov. 30, 1948 |
| 2,507,108 | Lange | May 9, 1950 |
| 2,605,118 | Booth et al. | July 29, 1952 |
| 2,923,555 | Kost et al. | Feb. 2, 1960 |
| 2,944,831 | Thomas | July 12, 1960 |